(12) United States Patent
Terashima

(10) Patent No.: US 6,434,335 B1
(45) Date of Patent: Aug. 13, 2002

(54) CAMERA

(75) Inventor: Jun Terashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/898,706

(22) Filed: Jul. 3, 2001

(30) Foreign Application Priority Data

Jul. 10, 2000 (JP) ...................................... 2000-208392

(51) Int. Cl.$^7$ ............................................. G03B 13/18
(52) U.S. Cl. ....................................................... 396/147
(58) Field of Search .............................. 396/147, 152, 396/150, 148, 287, 296

(56) References Cited

U.S. PATENT DOCUMENTS 5,603,068 A * 2/1997 Aihara ........................ 396/287
5,752,090 A * 5/1998 Nagano et al. .......... 396/147 X

* cited by examiner

Primary Examiner—W. B. Perkey
(74) Attorney, Agent, or Firm—Robin, Blecker & Daley

(57) ABSTRACT

A compact and inexpensive camera is provided, in which an illuminating unit for illuminating finder indices is arranged so as not to interfere with a quick-return reflecting mirror nor interfere with a built-in electronic flash device. A finder optical system has a focusing screen provided therein, which has at least one finder index formed thereon. A reflecting mirror is disposed to make upward and downward movements in a flipping motion area between a reflecting position where the reflecting mirror reflects and guides a photographic light beam to the finder optical system, and a shooting position where the reflecting mirror recedes from a photographic light path. An illuminating unit illuminates the at least one finder index formed on the focusing screen to display the at least one finder index in superposition on a finder image formed by the photographic light beam. The illuminating unit is arranged at a lateral side of the flipping motion area of the reflecting mirror. Illuminating light from the illuminating unit is reflected by the reflecting mirror located in the reflecting position to illuminate the at least one finder index.

12 Claims, 7 Drawing Sheets

CAMERA

BACKGROUND OF THE INVENTION

1. Field of the Invention

The present invention relates to a camera having a function of displaying various indices in superposition on a finder image, and in particular, to a single-lens reflex camera provided with a reflecting mirror that makes upward and downward movements between a reflecting position where the mirror reflects and guides a photographic light beam to a finder optical system and a shooting position where the mirror recedes from the photographic light path.

2. Description of the Related Art

Several single-lens reflex cameras have been proposed, in which indices for a light measuring area or a focus detecting area which are set on a photographing screen are displayed in a manner being superposed on a subject image in a finder screen.

Among these proposals, Japanese Laid-Open Patent Publication (Kokai) No. 3-230139, for example, discloses a method of displaying desired indices in a manner being superposed on a subject image in a finder screen by arranging a light emitting element as an illuminating light source and a flooding prism in front of a pentaprism and illuminating a focusing screen or focusing glass through a gap between the front side of the pentaprism and a mirror box via a reflecting mirror (hereinafter referred to as "the first method").

Further, Japanese Laid-Open Patent Publication (Kokai) No. 8-043913, for example, discloses a method of displaying desired indices in a manner being superposed on a subject image on a finder screen by arranging a light emitting element as an illuminating light source and a flooding prism source above the pentaprism above a pentaprism and causing illuminating light to enter the pentaprism and pass through the bottom thereof so that the light illuminates a displaying reflector arranged close to a focusing screen and the light reflected from the reflector is guided again into the pentaprism (hereinafter referred to as "the second method").

Moreover, Japanese Laid-Open Patent Publication (Kokai) No. 9-236858, for example, has proposed a method of displaying a desired display image in a manner being superposed on a subject image on a finder screen, using light dividing means provided in an ocular in a finder optical path or in a condenser lens arranged above a focusing screen (hereinafter referred to as "the third method"). According to this third method, a light emitting element as an illuminating light source and a flooding optical system are arranged above the ocular or the pentaprism. Further, the light dividing means used in the third method is very expensive.

In the first to third methods, however, the illuminating light source and the flooding prism are arranged in front of or above the pentaprism or above the ocular. Therefore, if an electronic flash device built in the camera main body is arranged close to the illuminating light source or the flooding prism, the locations of these components concur or interfere with each other. Thus, when the illuminating light source and the flooding prism are both built into the electronic flash device, the camera becomes necessarily be large in size.

Further, in the first method, the flooding prism is located below the focusing screen, thus disadvantageously hindering upward and downward movements of the reflecting mirror which is a quick-return mirror.

Moreover, in the second method, the illuminating light is passed through the pentaprism twice, thus leading to frequent occurrence of ghosts. Besides, in the second and third methods, the use of the displaying reflector or the expensive light dividing means increases the cost of the camera.

SUMMARY OF THE INVENTION

It is an object of the present invention to provide a compact and inexpensive camera in which an illuminating unit for illuminating finder indices is arranged so as not to interfere with a quick-return reflecting mirror nor interfere with a built-in electronic flash device.

To attain the above object, the present invention provides a camera comprising a finder optical system having a focusing screen provided therein, the focusing screen having at least one finder index formed thereon, a reflecting mirror disposed to make upward and downward movements in a flipping motion area between a reflecting position where the reflecting mirror reflects and guides a photographic light beam to the finder optical system, and a shooting position where the reflecting mirror recedes from a photographic light path, and an illuminating unit that illuminates the at least one finder index formed on the focusing screen to display the at least one finder index in superposition on a finder image formed by the photographic light beam, and wherein the illuminating unit is arranged at a lateral side of the flipping motion area of the reflecting mirror, and illuminating light from the illuminating unit is reflected by the reflecting mirror located in the reflecting position to illuminate the at least one finder index.

In a preferred form of the present invention, the camera according to the invention comprises a mirror box accommodating the reflecting mirror and having a side wall having an opening formed therein, and the illuminating unit applies the illuminating light to the reflecting mirror from outside of the side wall of the mirror box through the opening.

The illuminating unit may comprise a light source for generating the illuminating light, and a flooding optical system for guiding the illuminating light from the light source to the reflecting mirror. The flooding optical system may comprise a prism element.

Preferably, the at least one finder index comprises at least one array of microprisms formed on the focusing screen.

Preferably, the illuminating light from the illuminating unit enters the at least one finder index at an angle which is different from that of the photographic light beam, after being reflected by the reflecting mirror.

In a preferred embodiment of the present invention, the camera according to the invention comprises a camera body having a film cartridge loading chamber and a film winding chamber formed therein, and the illuminating unit is arranged in a space between the flipping motion area of the reflecting mirror and one of the film cartridge loading chamber and the film winding chamber.

Preferably, an electric circuit unit for driving the illuminating unit may be arranged in the space between the flipping motion area of the reflecting mirror and the one of the film cartridge loading chamber and the film winding chamber.

Also preferably, a mirror driving mechanism for driving the reflecting mirror for upward and downward movements may be arranged in the space between the flipping motion area of the reflecting mirror and the other of the film cartridge loading chamber and the film winding chamber.

Typically, the at least one finder index is used to display at least one focus detecting area, or at least one light measuring area.

Preferably, a built-in electronic flash device may be arranged in proximity to the finder optical system.

With the above arrangement of the present invention, the illuminating unit for illuminating one or more finder indices is arranged at a lateral side of the flipping motion area of the reflecting mirror so that illuminating light from the illuminating unit is reflected by the reflecting mirror located in the reflecting position so as to illuminate the finder indices. Thus, the illuminating unit can be arranged so as to avoid interference with the upward and downward movements (flipping motoins) of the reflecting mirror as well as to avoid interference with the built-in electronic flash device arranged in proximity to (above or in front of) the finder optical system. As a result, the size of the entire camera can be reduced.

Further, if a pentaprism is provided in the finder optical system, light is passed through the pentaprism only once, thus restraining the occurrence of ghosts. Moreover, no expensive optical parts are required, thereby making it possible to reduce the cost of the camera.

Furthermore, since the illuminating unit is arranged in the space between the flipping motion area of the reflecting mirror (or the side wall of the mirror box) and the film cartridge loading chamber or the film winding chamber formed in the camera main body, the space conventionally constituting a dead space, the space in the camera can be used more efficiently and the size of the camera can further be reduced.

The above and other objects, features and advantages of the invention will become more apparent from the following detailed description taken in conjunction with the accompanying drawings.

DESCRIPTION OF THE PREFERRED EMBODIMENTS

The present invention will be described below with reference to the drawings showing a preferred embodiment thereof.

Figure 1:
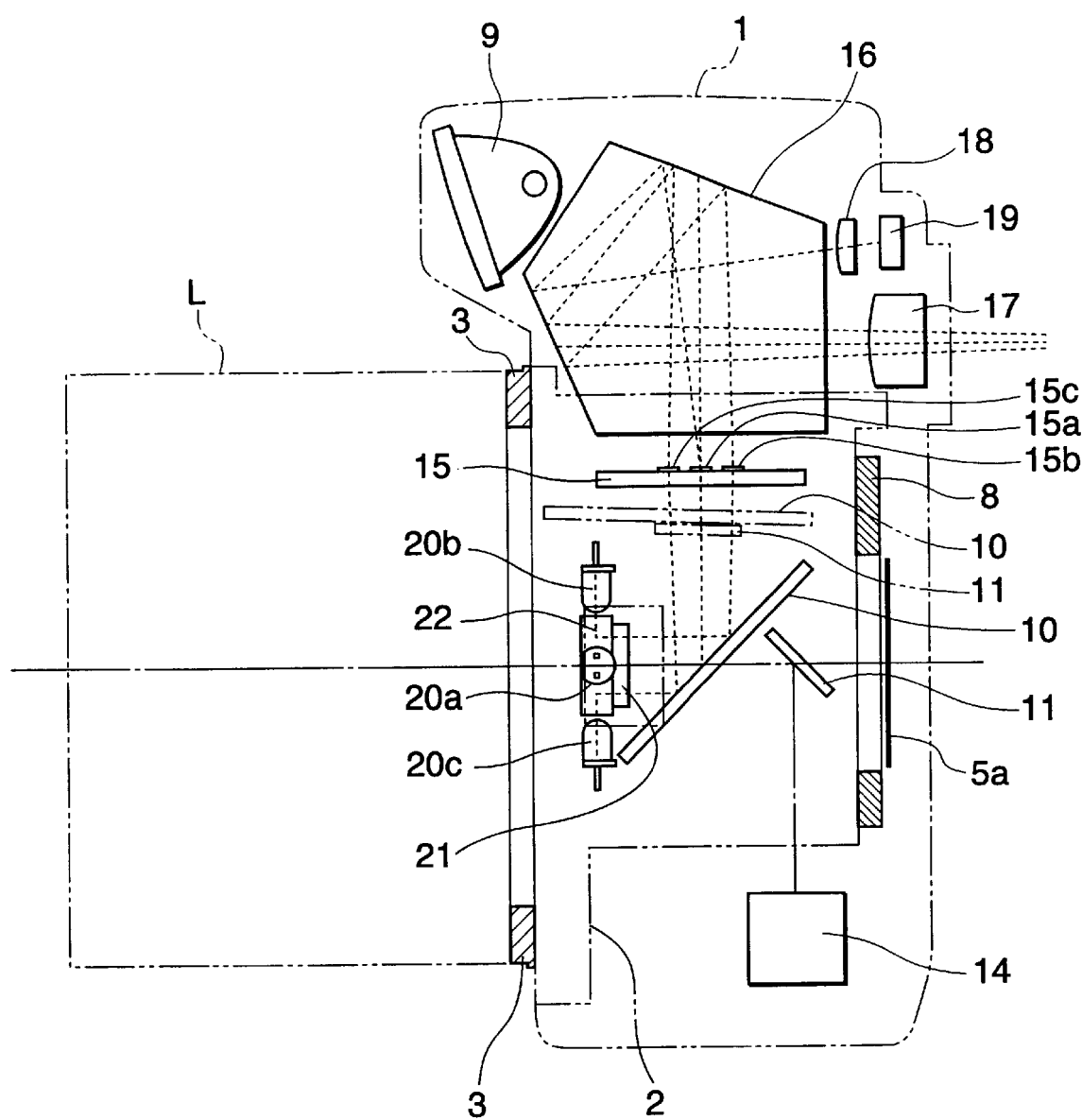
FIG. 1 is a view, partly in section, showing the interior of a camera according to an embodiment of the present invention as viewed from a side thereof.
Figure 2:
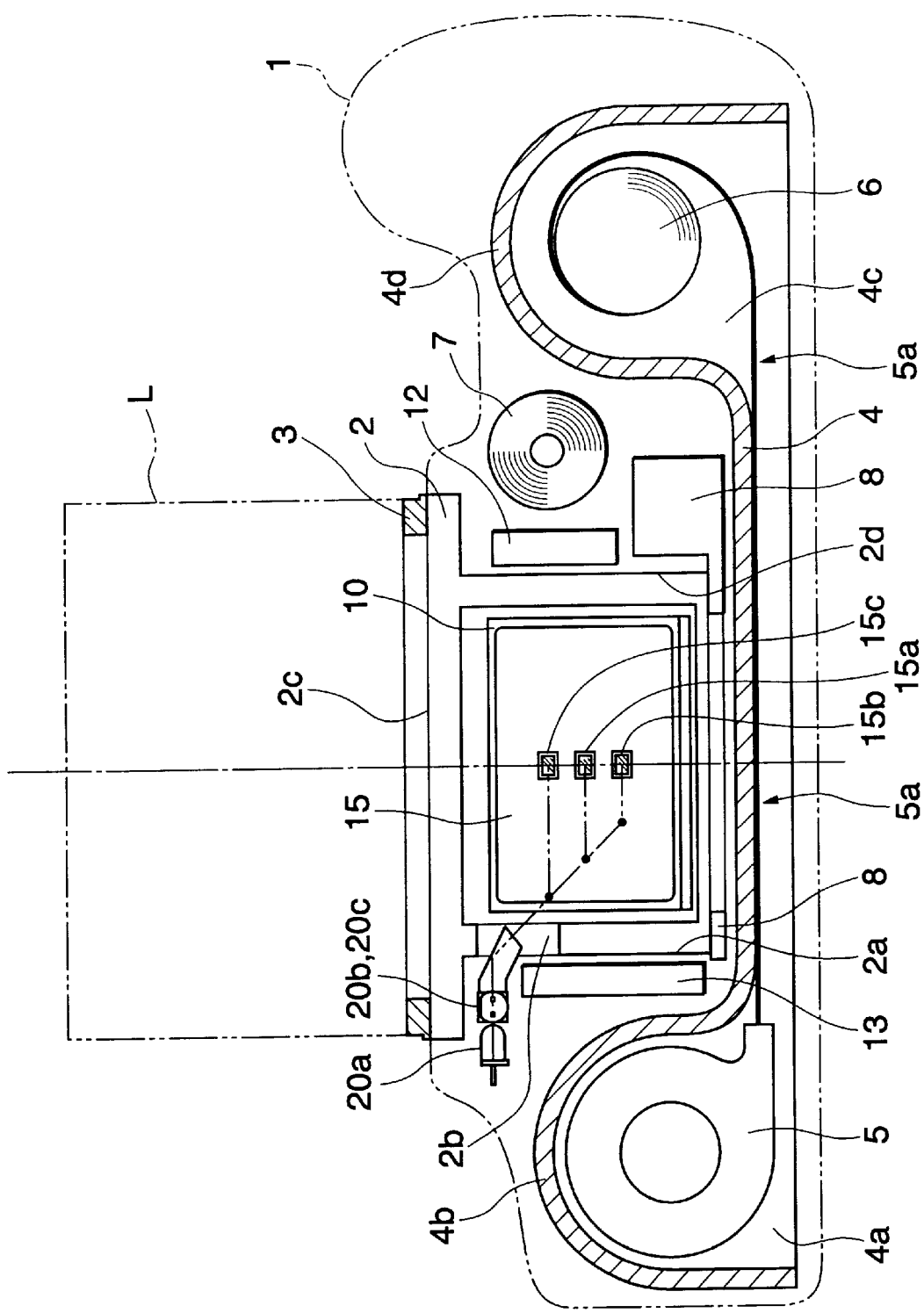
FIG. 2 is a view, partly in section, showing the interior of the camera as viewed from above.
Figure 3:
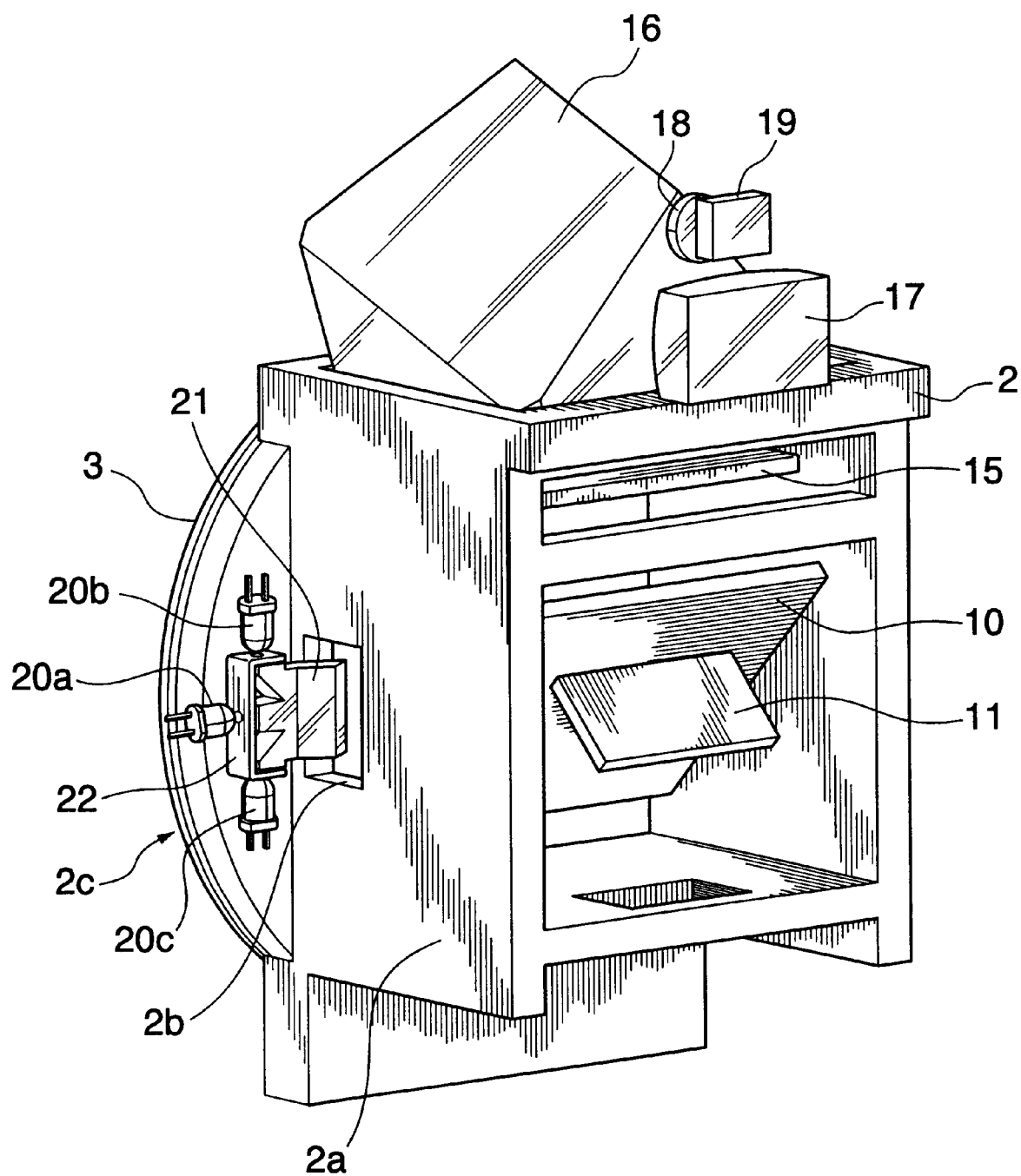
FIG. 3 is a perspective view showing a mirror box of the camera and its peripheral parts as viewed from behind.

FIGS. 1 to 8 show the construction of a camera according to an embodiment of the present invention. FIG. 1 is a view, partly in section, showing the interior of the camera as viewed from a side thereof. FIG. 2 is a view, partly in section, showing the interior of the camera as viewed from above. FIG. 3 is a perspective view showing a mirror box of the camera and its peripheral parts as viewed from behind.

Figure 4:
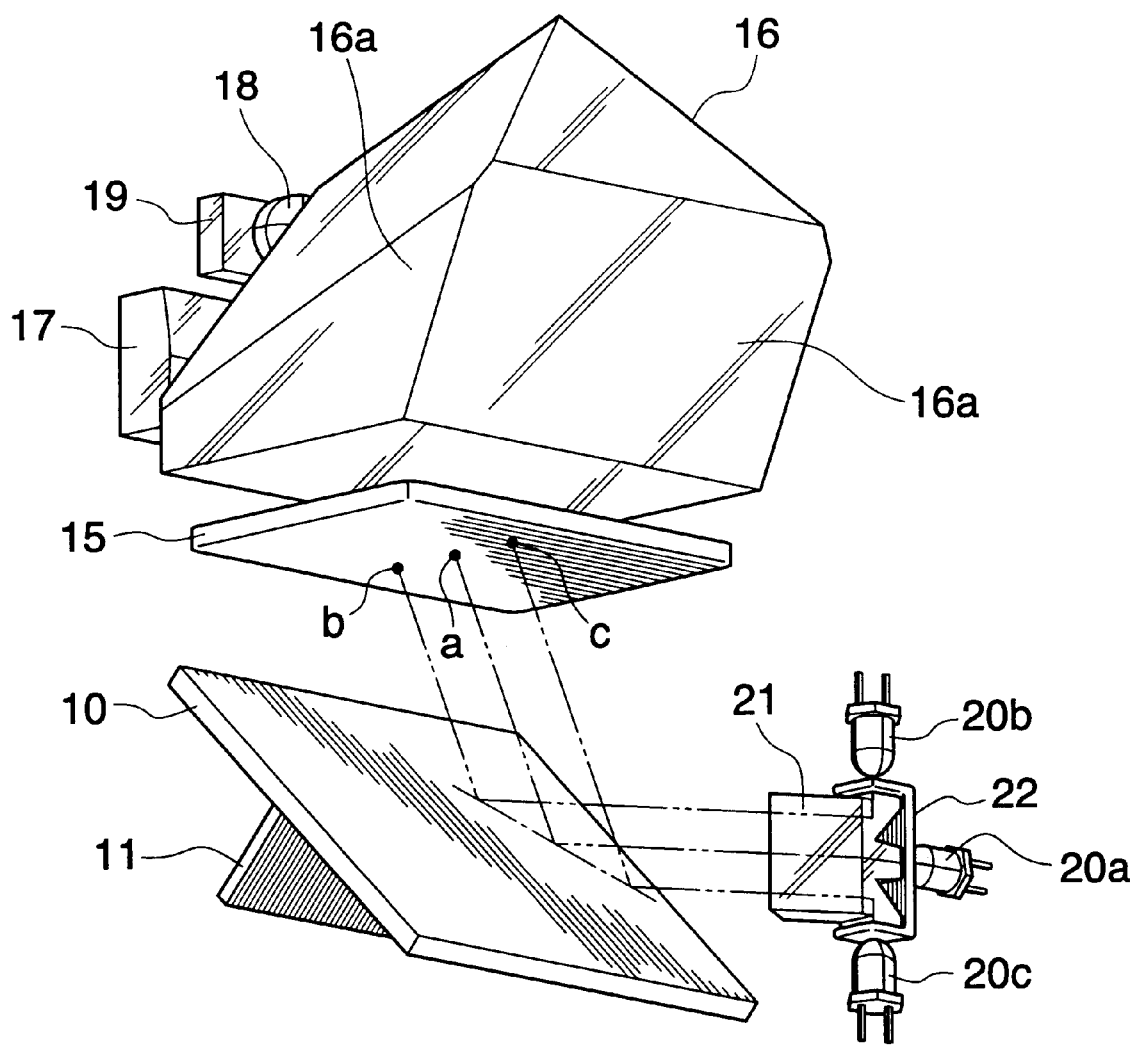
FIG. 4 is a perspective view showing the interior of the mirror box as viewed from ahead.
Figure 5:
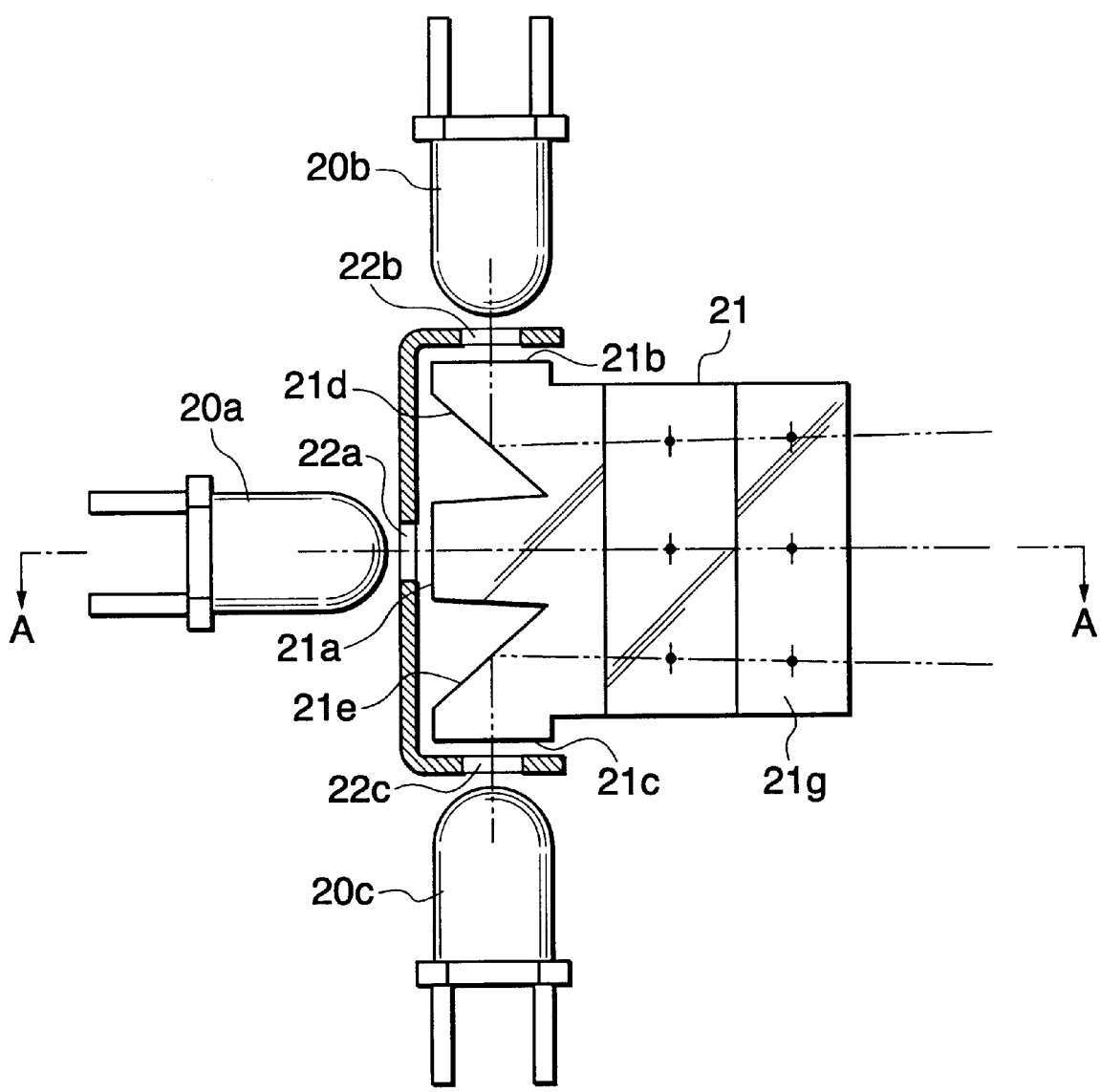
FIG. 5 is a view, partly in section, showing the construction of a finder illuminating unit of the camera.
Figure 6:
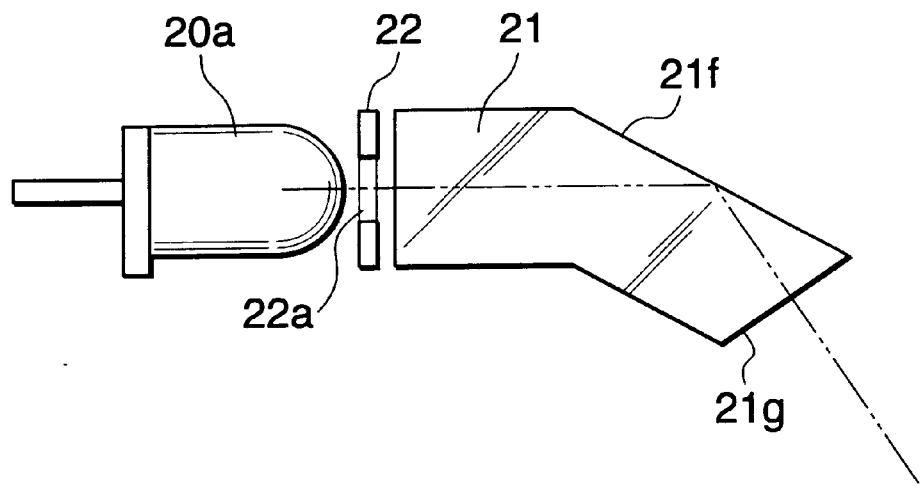
FIG. 6 is a view showing the construction of the finder illuminating unit as viewed from above the camera.
Figure 7:
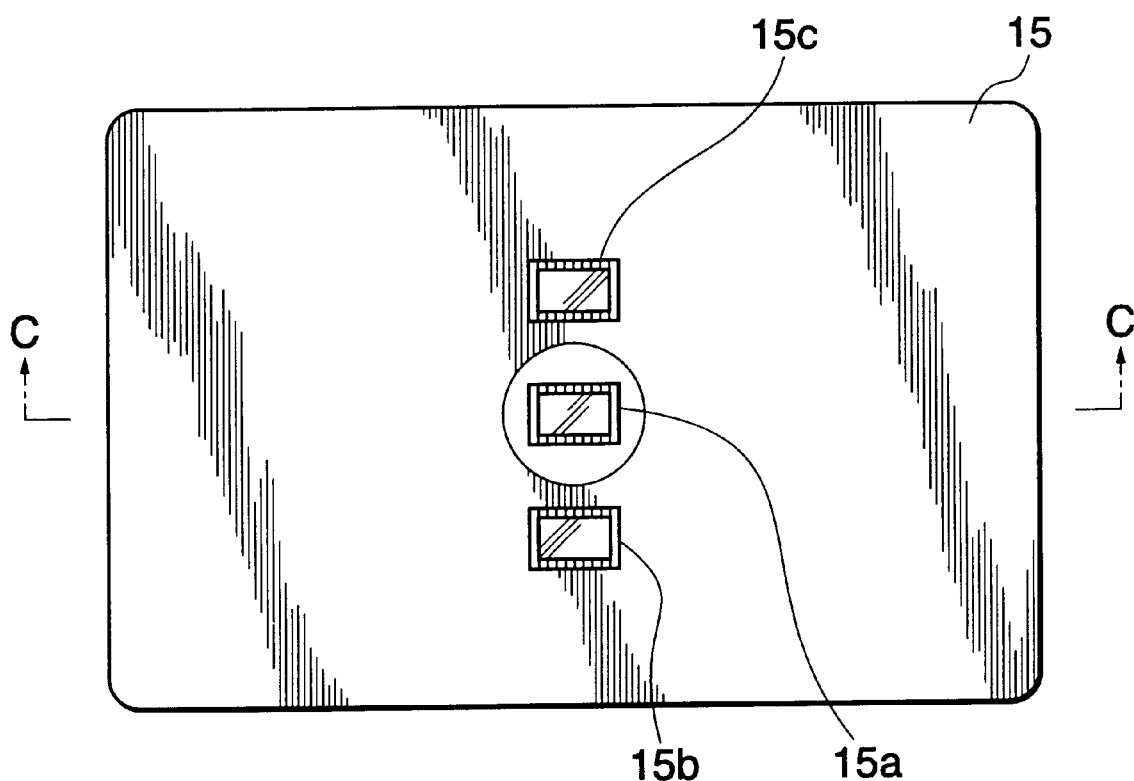
FIG. 7 is a top view showing the construction of a focusing screen of the camera.
Figure 8:
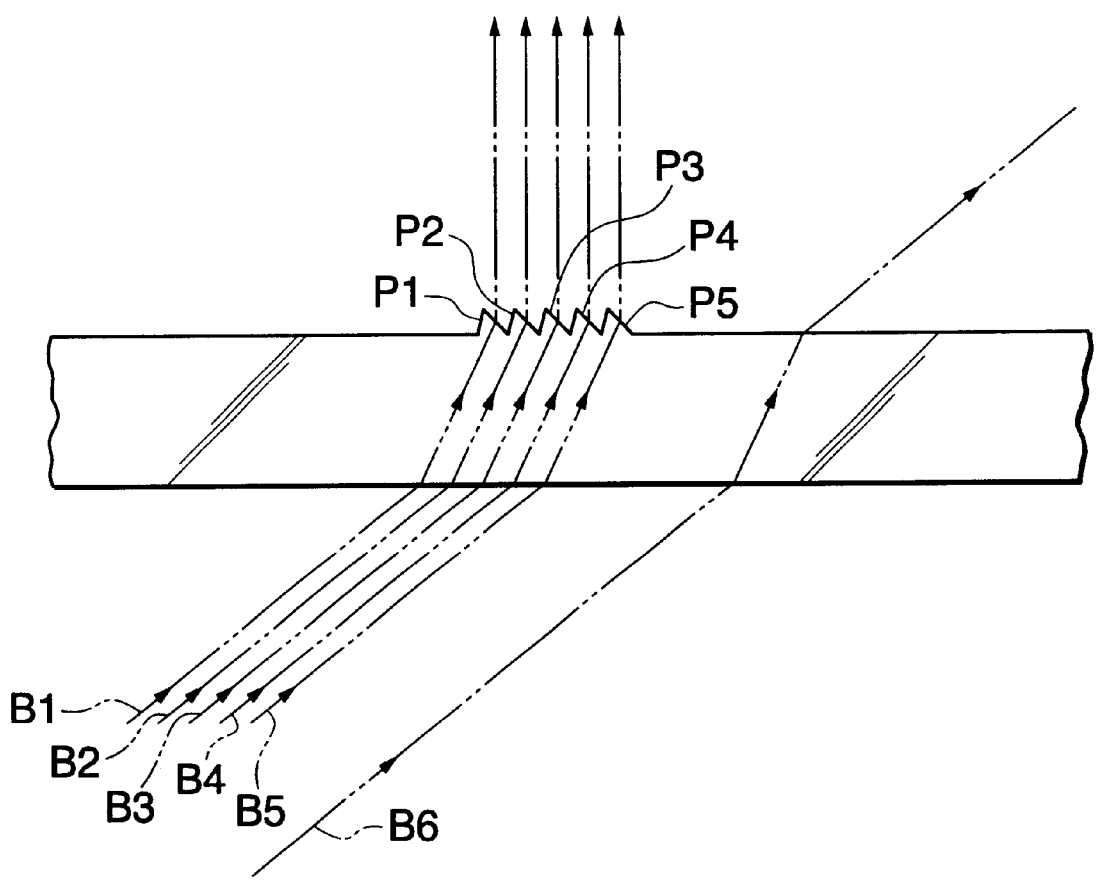
FIG. 8 is a sectional view showing the construction of the focusing screen.

FIG. 4 is a perspective view of the interior of the mirror box as viewed from obliquely ahead. FIGS. 5 and 6 are views showing the construction of an illuminating unit. FIGS. 7 and 8 are views showing the construction of a focusing screen of the camera.

In FIGS. 1 and 2, reference character L denotes a photographing lens and reference numeral 1 denotes an armor of the camera in which the photographing lens L is installed. Reference numeral 4 denotes a main body of the camera covered with the armor 1. A partition wall 4b of the camera main body 4, shown in the left side of FIG. 2, defines a cartridge chamber 4a (film cartridge-loading chamber) in which a film cartridge 5 is loaded. A partition wall 4d, shown in the right side of FIG. 2, defines a film winding chamber 4c that accommodates a winding spool 6 for winding up a film 5a drawn out from the film cartridge 5. Reference numeral 2 denotes a mirror box fixed to the camera main body 4 substantially in a central portion thereof in a transverse direction. Reference numeral 2a denotes a side wall of the mirror box 2 which is closer to the cartridge chamber 4a, and reference numeral 2b denotes an opening formed in a front portion of the side wall 2a. Further, reference numeral 2d denotes a side wall of the mirror box 2 which is closer to the film winding chamber 4c, and reference numeral 2c denotes a mount attaching surface formed at a front end portion of the mirror box 2 (FIG. 3).

Reference numeral 3 denotes a mount attached on the mount attaching surface 2c of the mirror box 2 and on which the photographing lens L is installed by means of a bayonet connection or the like, not shown.

Reference numeral 7 denotes a film winding motor arranged between the side wall 2d of the mirror box 2 closer to the film winding chamber 4c and the partition wall 4d of the camera main body 4 defining the film winding chamber 4c. The motor 7 transmits a driving force to the winding spool 6 via a deceleration mechanism, not shown. Reference numeral 8 denotes a shutter device.

In FIG. 1, reference numeral 9 denotes an electronic flash device which is arranged in front of a pentaprism 16, hereinafter described. The electronic flash device 9 can be popped up and down relative to the camera main body 4 by means of an elevating mechanism, not shown, and is popped up for stroboscopic photographing.

Reference numeral 10 denotes a quick-return main mirror (reflecting mirror) accommodated in the mirror box 2. By means of a mirror driving mechanism 12 arranged between the side wall 2d of the mirror box 2 closer to the film winding chamber 4c and the motor 7, the main mirror 10 can be moved up and down (flipping motion) between a position (reflecting position) where it is obliquely arranged in a photographing optical path extending through the photographing lens L and the film 5a and a position (shooting position) above the photographic light path, where it is caused to recede from the photographic light path. The main mirror 10, when located in the reflecting position, allows a part of a photographic light beam to pass therethrough, while reflecting the remainder to a finder optical system located above the main mirror 10.

Reference numeral 11 denotes a submirror arranged behind the main mirror 10. The submirror 11 is folded and extended relative to the main mirror 10 in response to upward and downward movements of the main mirror 10.

That is, for observation through the finder, the mirror driving mechanism 12 lowers the main mirror 10 down to the reflecting position, while extending the submirror 11, as shown by solid lines in FIG. 1. On the other hand, for film exposure, the mirror driving mechanism 12 elevates the main mirror 10 up to the shooting position, while folding the submirror 11, as shown by broken lines in FIG. 1.

Reference numeral 13 denotes a main circuit unit (electric circuit unit) comprised of main electric parts mounted on a substrate. The main circuit unit 13 is arranged between the side wall 2a of the mirror box 2 closer to the cartridge chamber 4a and the partition wall 4b of the camera main body 4 defining the cartridge chamber 4a.

Reference numeral 14 denotes a focus detecting device arranged below the submirror 11 and under the mirror box 2 as shown in FIG. 1.

Reference numeral 15 denotes a focusing screen or focusing glass arranged above a flipping motion area of the main mirror 10 within the mirror box 2 and at a location that is conjugate with the film (film surface) 5a. The focusing screen 15 has subject detecting area indices (finder indices) 15a, 15b, and 15c each formed of an array of microprisms as shown in FIGS. 7 and 8. The subject detecting area indices 15a, 15b, and 15c are provided at locations corresponding to a plurality of focus detecting areas or light measuring areas.

Reference numeral 16 denotes a pentaprism, and reference numeral 17 denotes an ocular arranged behind the pentaprism 16. The focusing screen 15, the pentaprism 16, and the ocular 17 constitute a finder optical system.

Reference numeral 18 denotes a light measuring lens arranged behind the pentaprism 16 and above the ocular 17. Reference numeral 19 denotes a light measuring sensor for measuring the luminance of a subject through the pentaprism 16 and the light measuring lens 18.

Reference numerals 20a, 20b, and 20c denote light emitting elements (light source) constituting a finder illuminating unit. Reference numeral 21 denotes a flooding prism (flooding optical system or prism element) also constituting the finder illuminating unit. This finder illuminating unit is arranged behind the mount attaching surface 2c of the mirror box 2 and in a space between the side wall 2a of the mirror box 2 closer to the cartridge chamber 4a (that is, at a lateral side of the flipping motion area of the main mirror 10) and the partition wall 4b of the camera main body 4 closer to the cartridge chamber 4a, as shown in FIGS. 2 and 3.

By thus arranging the finder illuminating unit at the lateral side of the flipping motion area of the main mirror 10 (which is a side remote from the side on which the mirror driving mechanism 12 is arranged), a space for mounting the electronic flash device 9 can be easily secured in front of the finder optical system in such a manner that the finder illuminating unit will not interfere with the upward and downward movements of the main mirror 10 or the operation of the mirror driving mechanism 12. Accordingly, the size of the entire camera can be reduced.

Further, by arranging the finder illuminating unit in the space between the side wall 2a of the mirror box 2 which is closer to the cartridge chamber 4a and the partition wall 4b of the camera main body 4 which defines the cartridge chamber 4a, the space constituting a dead space in a conventional camera, the space in the camera can be used more efficiently and the size of the camera can further be reduced.

Then, a finder light beam and an illuminating light beam will be described. A photographic light beam passing through the photographing lens L is partly transmitted through the main mirror 10, and is then reflected downward by the submirror 11 and guided to the focus detecting device 14. The main circuit unit 13 drives the photographing lens L for focusing thereof based on an output from the focus detecting device 14.

Further, a photographic light beam reflected upward by the main mirror 10 forms an image of the subject (finder image) on the focusing screen 15. The subject image on the focusing screen 15 is guided through the pentaprism 16 to the ocular 17, through which the photographer observes the image. A part of the subject image formed on the focusing screen 15 passes through the light measuring lens 18 to form an image on the light measuring sensor 19, whereby the luminance of the subject is detected, and based on the detected luminance, the main circuit 13 controls a diaphragm, not shown, and the shutter device 8.

Illuminating light emitted from the light emitting elements 20a, 20b, and 20c of the finder illuminating unit enters the flooding prism 21, where it is totally reflected to have its direction changed to exit from a light exit surface 21g of the flooding prism 21, as shown in FIGS. 4 to 6.

The illuminating light emitted from the light exit surface 21g passes through the opening 2b in the mirror box 2 and enters the main mirror 10 in the reflecting position at an angle.

The illuminating light is reflected obliquely upward by the main mirror 10 to enter the focusing screen 15 at an angle, that is, at an angle which is different from that of the photographic light beam, thereby illuminating the subject detecting area indices 15a, 15b, and 15c and their peripheral regions on the focusing screen 15.

The light emitting elements 20a, 20b, and 20c are provided as illuminating light sources corresponding to the subject detecting area indices 15a, 15b, and 15c, respectively. The illuminating light applied to the subject detecting area indices 15a, 15b, and 15c transmits therethrough while being refracted by the arrays of microprisms constituting the corresponding subject detecting area indices. The resulting light beams travel substantially vertically upward and pass through the pentaprism 16 and are then guided to the ocular 17 and then to the photographer's eye.

Since the illuminating light illuminating the subject detecting area indices 15a, 15b, and 15c enters the focusing screen 15 at the angle which is different from that of the photographic light beam as described above, light beams of the illuminating light which do not pass through the arrays of microprisms are prevented from reaching the ocular 17 and from being observed by the photographer. Thus, only the portions of the focusing screen 15 where the microprisms are formed appear shiny to the photographer. Furthermore, the light beams of the illuminating light which do not pass through the arrays of the microprisms reach an inked surface 16a of the pentaprism 16, by which they are absorbed.

Next, the construction of the finder illuminating unit will be described in detail with reference to FIGS. 5 and 6. FIG. 5 is a view of the construction of the finder illuminating unit as viewed from behind the camera. FIG. 6 is a view of the construction of the finder illuminating unit as viewed from above the camera.

The three light emitting elements 20a, 20b, and 20c are each formed of a resin in one piece. The flooding prism 21 has incident surfaces 21a, 21b, and 21c corresponding, respectively, to the light emitting elements 20a, 20b, and 20c, and also has inner reflecting surfaces 21d, 21e, and 21f; it is generally bent through an obtuse angle. Moreover, the flooding prism 21 has a Fresnel lens formed on the light exit surface 21g of the flooding prism 21 such that the flooding prism 21 constitutes an optical system for forming an image on the focusing screen 15.

A mask 22 is arranged between the light emitting elements 20a, 20b, and 20c and the flooding prism 21. The mask 22 has openings 22a, 22b, and 22c formed therein and corresponding, respectively, to the light emitting elements 20a, 20b, and 20c so that light beams from these openings are formed into an image on the focusing screen 15.

The light emitted from the light emitting element 20a passes through the opening 22a in the mask 22 and then enters the incident surface 21a of the flooding prism 21. Then, the light is totally reflected by the reflecting surface 21f and passes through the Fresnel lens on the light exit surface 21g.

Further, the light emitted from the light emitting element 20b passes through the opening 22b in the mask 22 and then enters the incident surface 21b of the flooding prism 21. Then, the light is totally reflected first by the reflecting surface 21d and then by the reflecting surface 21f and passes through the Fresnel lens on the light exit surface 21g.

Similarly, the light emitted from the light emitting element 20c passes through the opening 22c in the mask 22 and then enters the incident surface 21c of the flooding prism 21. Then, the light is totally reflected first by the reflecting surface 21e and then by the reflecting surface 21f and passes through the Fresnel lens in the light exit surface 21g.

Next, the construction of the focusing screen 15 will be described in detail with reference to FIGS. 7 and 8. FIG. 7 is a view of the construction of the focusing screen as viewed from above the camera. FIG. 8 is a sectional view of the construction of the focusing screen 15 shown in FIG. 7.

As the subject detecting area indices 15a, 15b, and 15c, the arrays of microprisms, which are in the form of rectangular frames, are formed on a surface of the focusing screen 15 at a central portion thereof in the direction of long sides thereof and at three locations in the direction of short sides thereof.

References numerals P1 to P5, shown in FIG. 8, denote the microprisms, each having a wedge-like cross section. Reference numerals B1 to B5 denote those of the light beams entering the focusing screen 15 from the finder illuminating unit which pass through the microprisms.

The light beams B1 to B5 are refracted when emitted from the microprisms, and are then guided to the ocular 17 via the pentaprism 16.

A light beam B6 that does not pass through the microprism exits from the focusing screen 15 at substantially the same angle as the incident angle. Thus, the light beam B6 does not reach the ocular 17.

Next, a description will be given of a manner in which the subject detecting area indices 15a, 15b, and 15c illuminated by the finder illuminating unit are displayed in superposition on the subject image on the finder screen. Here, by way of example, the subject detecting area indices 15a, 15b, and 15c are indicative of focus detecting areas.

When focus detection information concerning the subject is output from the focus detecting device 14, the main circuit unit 13 determines an optimal one of the three focus detecting areas based on this focus detection information. The main circuit unit 13 controls the driving of the photographing lens L so as to bring the determined focus detecting area into focus. At the same time, the main circuit unit 13 lights one of the three light emitting elements 20a, 20b, and 20c which corresponds to the determined focus detecting area. At this time, the main circuit unit 13 controls the luminance of the lit light emitting element based on an output from the light measuring sensor 19. This light emission illuminates the rectangular frame-shaped index corresponding to the determined focus detecting area, i.e. the one of the subject detecting areas 15a, 15b, and 15c, so that the illuminated index is displayed shinily as an image in superposition on the subject image on the finder screen. Then, the photographer views this displayed shiny index superposed on the subject image to clearly determine a point on the subject image, which is in focus.

In the present embodiment, the illuminating light from the finder illuminating unit is passed through the pentaprism 16 only once, thus restraining the occurrence of ghosts. Furthermore, the finder illuminating unit employed in the present embodiment uses no expensive optical parts such as light dividing means, thus making it possible to reduce the cost of the camera.

In the present embodiment, the indices 15a, 15b, and 15c on the focusing screen 15 correspond to the focus detecting areas, but they may correspond to light measuring areas.

What is claimed is:

1. A camera comprising:
    a finder optical system having a focusing screen provided therein, said focusing screen having at least one finder index formed thereon;
    a reflecting mirror disposed to make upward and downward movements in a flipping motion area between a reflecting position where said reflecting mirror reflects and guides a photographic light beam to said finder optical system, and a shooting position where said reflecting mirror recedes from a photographic light path; and
    an illuminating unit that illuminates the at least one finder index formed on said focusing screen to display the at least one finder index in superposition on a finder image formed by the photographic light beam; and
    wherein:
        said illuminating unit is arranged at a lateral side of the flipping motion area of said reflecting mirror; and
        illuminating light from said illuminating unit is reflected by said reflecting mirror located in the reflecting position to illuminate the at least one finder index.

2. A camera according to claim 1, comprising a mirror box accommodating said reflecting mirror and having a side wall having an opening formed therein, and wherein said illuminating unit applies the illuminating light to said reflecting mirror from outside of the side wall of said mirror box through said opening.

3. A camera according to claim 1 or 2, wherein said illuminating unit comprises a light source for generating the illuminating light, and a flooding optical system for guiding the illuminating light from said light source to said reflecting mirror.

4. A camera according to claim 3, wherein said flooding optical system comprises a prism element.

5. A camera according to claim 1, wherein said at least one finder index comprises at least one array of microprisms formed on said focusing screen.

6. A camera according to claim 1, wherein the illuminating light from said illuminating unit enters the at least one finder index at an angle which is different from that of the photographic light beam, after being reflected by said reflecting mirror.

7. A camera according to claim 1, comprising a camera body having a film cartridge loading chamber and a film winding chamber formed therein, and wherein said illuminating unit is arranged in a space between the flipping motion area of said reflecting mirror and one of said film cartridge loading chamber and said film winding chamber.

8. A camera according to claim 7, comprising an electric circuit unit arranged in the space between the flipping motion area of said reflecting mirror and the one of said film cartridge loading chamber and said film winding chamber, for driving said illuminating unit.

9. A camera according to claim 7, comprising a mirror driving mechanism arranged in the space between the flipping motion area of said reflecting mirror and the other of the film cartridge loading chamber and the film winding chamber, for driving said reflecting mirror for upward and downward movements.

10. A camera according to claim 1, wherein the at least one finder index displays at least one focus detecting area.

11. A camera according to claim 1, wherein the at least one finder index displays at least one light measuring area.

12. A camera according to claim 1, further comprising a built-in electronic flash device arranged in proximity to said finder optical system.

* * * * *

UNITED STATES PATENT AND TRADEMARK OFFICE
CERTIFICATE OF CORRECTION

PATENT NO.     : 6,434,335 B1                                                   Page 1 of 1
DATED          : August 13, 2002
INVENTOR(S)    : Jun Terashima It is certified that error appears in the above-identified patent and that said Letters Patent is hereby corrected as shown below:

Column 7,
Line 8, delete "22ain" and insert -- 22a in --.
Line 9, "delete "21aof" and insert -- 21a of --.

Signed and Sealed this

Thirtieth Day of September, 2003

JAMES E. ROGAN
*Director of the United States Patent and Trademark Office*